(12) United States Patent
Vallin et al.

(10) Patent No.: US 12,373,275 B1
(45) Date of Patent: Jul. 29, 2025

(54) DEVICES, SYSTEMS, AND METHODS FOR OUT-OF-BAND LOGGING AND DELIVERY OF ERROR REPORTS

(71) Applicant: Advanced Micro Devices, Inc., Santa Clara, CA (US)

(72) Inventors: Carlos Vallin, Austin, TX (US); Vilas Sridharan, Boxborough, MA (US); Francisco L. Duran, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 217 days.

(21) Appl. No.: 18/089,131

(22) Filed: Dec. 27, 2022

(51) Int. Cl.
*G06F 11/00* (2006.01)
*G06F 11/07* (2006.01)

(52) U.S. Cl.
CPC ...... *G06F 11/0784* (2013.01); *G06F 11/0721* (2013.01)

(58) Field of Classification Search
CPC ............. G06F 11/0784; G06F 11/0721; G06F 11/0787
See application file for complete search history.

(56) References Cited

U.S. PATENT DOCUMENTS

| | | | | |
|---|---|---|---|---|
| 7,370,243 B1* | 5/2008 | Grohoski | ............... | G06F 9/3891 714/48 |
| 7,447,852 B1* | 11/2008 | Justiss | ................. | G06F 11/0784 711/100 |
| 7,546,487 B2* | 6/2009 | Marisetty | ............ | G06F 11/0706 714/10 |
| 10,574,509 B2* | 2/2020 | Kondapi | ............. | G06F 11/0748 |
| 10,585,826 B2* | 3/2020 | Jayasena | ................. | G06F 13/24 |
| 11,023,302 B2* | 6/2021 | Thornley | ............ | G06F 11/0772 |
| 2007/0011507 A1* | 1/2007 | Rothman | ............ | G06F 11/2736 714/E11.174 |
| 2010/0235688 A1* | 9/2010 | Bennah | ............... | G06F 11/0706 714/57 |
| 2013/0339829 A1* | 12/2013 | Vargas | ................ | G06F 11/1004 714/807 |
| 2016/0055052 A1* | 2/2016 | Hu | ......................... | G06F 11/10 714/799 |
| 2017/0116103 A1* | 4/2017 | Cencini | .................... | H04L 41/24 |
| 2017/0344414 A1* | 11/2017 | Raj | ....................... | G06F 11/076 |
| 2020/0371695 A1* | 11/2020 | Gopal | ................... | G06F 3/0658 |
| 2021/0200618 A1* | 7/2021 | Magro | ................... | G06F 3/0679 |
| 2022/0129350 A1* | 4/2022 | Sharma | ................. | G06F 3/0619 |
| 2022/0318087 A1* | 10/2022 | Hong | .................. | G06F 11/0793 |
| 2023/0195568 A1* | 6/2023 | Hong | ................... | G06F 11/073 714/764 |

OTHER PUBLICATIONS

International Search Report and Written Opinion from corresponding International Application No. PCT/US2023/086035, dated Apr. 30, 2024 (10 pages). (Year: 2024).*

* cited by examiner

*Primary Examiner* — Elmira Mehrmanesh
(74) *Attorney, Agent, or Firm* — Greenberg Traurig, LLP

(57) ABSTRACT

An exemplary computing device comprises an in-band processor and an out-of-band controller. The exemplary computing device also comprises a machine check architecture that includes a pipeline and a plurality of error detectors. The error detectors are configured to detect errors that occur in a plurality of circuits and report the errors to the in-band processor and the out-of-band controller via the pipeline. Various other devices, systems, and methods are also disclosed.

19 Claims, 5 Drawing Sheets

DEVICES, SYSTEMS, AND METHODS FOR OUT-OF-BAND LOGGING AND DELIVERY OF ERROR REPORTS

BACKGROUND

Machine check architectures are often used to report errors to operating systems running on processors. In some examples, an operating system running on a processor logs the errors and forwards a copy of the errors to an out-of-band controller (e.g., a baseboard management controller). This forwarding of the copy of errors constitutes out-of-band work for the operating system and/or processor. For example, the processor can expend and/or dedicate compute cycles to forwarding the copy of errors to the out-of-band controller, which can potentially lead to performance degradation for the substantive in-band workload (e.g., user applications). The instant disclosure, therefore, identifies and addresses a need for additional and improved devices, systems, and methods for out-of-band logging and delivery of error reports generated by machine check architectures.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Figure 1:
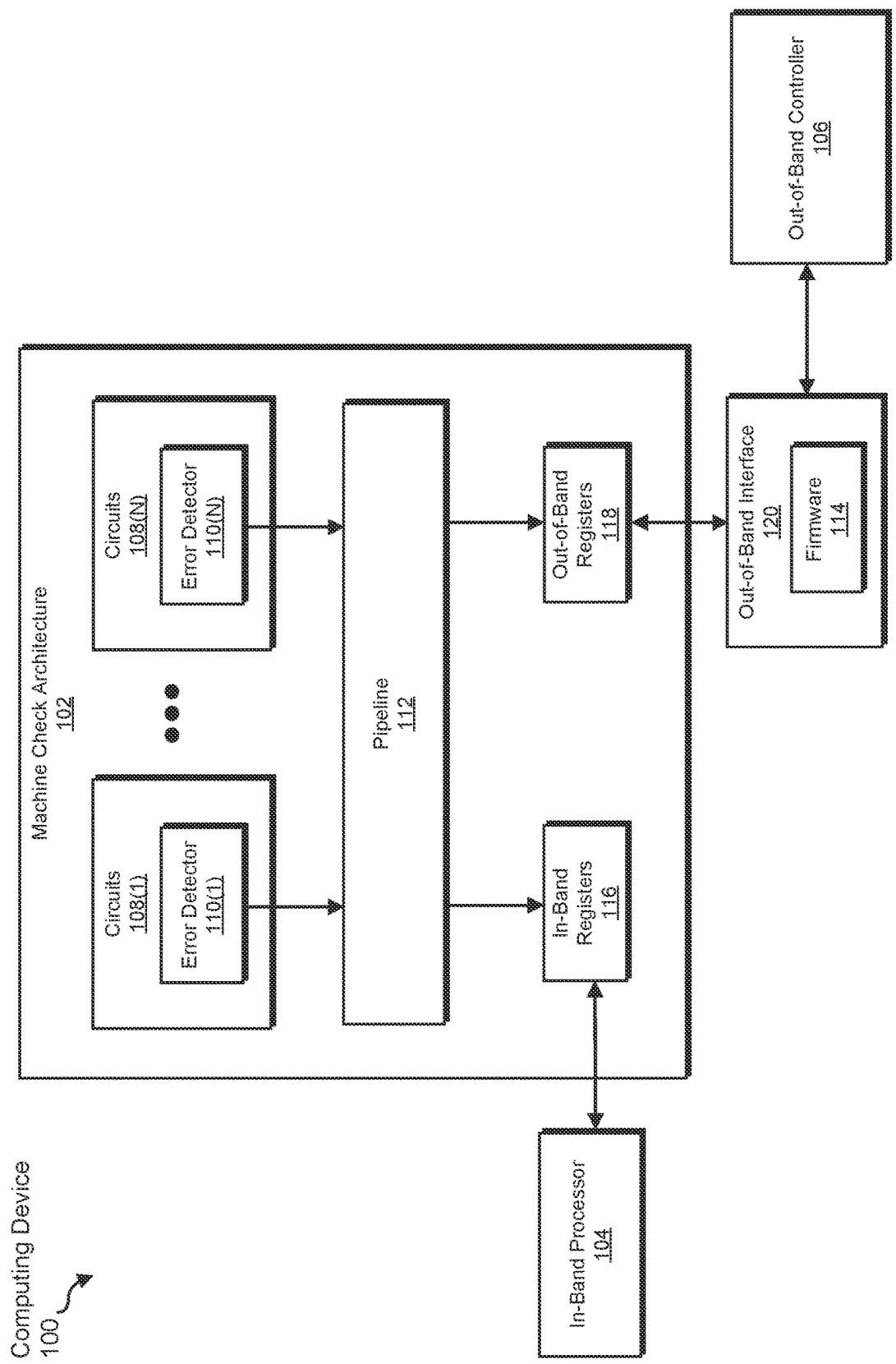
FIG. 1 is a block diagram of a portion of an exemplary computing device that facilitates out-of-band delivery of error reports according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various devices, systems, and methods for out-of-band logging and delivery of error reports. In some examples, traditional delivery of error reports to an out-of-band controller (e.g., a baseboard management controller) can impair and/or degrade the performance of processors that forward the error reports. In addition to forwarding the error reports to the out-of-band controllers, such processors often elevate the reporting privileges above those of typical user applications, thus pushing the processors to operate in system management mode. Unfortunately, system management mode creates security vulnerabilities that can enable malware to gain control of the processors.

Moreover, machine check architectures implementations often involve shadow registers that are accessible to both the operating system and the out-of-band controller for changing the state of the error reports. These shadow registers can create race conditions between the operating system and the out-of-band controller, potentially leading to undesirable results and/or sequencing. As will be described in greater detail below, the devices, systems, and methods described herein can enhance and/or augment machine check architectures so that reporting entities (e.g., memory controllers, processor cores, etc.) are able to send error reports to the processor and the out-of-band controller simultaneously and independently of each other.

For example, an enhanced block and/or circuit of a machine check architecture can constitute and/or represent a single unified interface that includes a fork creating two independent and/or parallel lanes for reporting errors to the processor and the out-of-band controller simultaneously. By doing so, the enhanced block and/or circuit of the machine check architecture facilitates error reporting to both the processor and the out-of-band controller without the need for the operating system running on the processor to expend in-band workload potential for out-of-band error reporting, thereby improving the performance of the user applications running on the processor.

In addition, the enhanced block and/or circuit of the machine check architecture facilitates error reporting to both the processor and the out-of-band controller without elevating the processor to system management mode or creating race conditions between the operating system and the out-of-band controller, thereby improving the security of the processor and/or mitigating inaccurate error states due to race conditions. For example, in a race condition, the out-of-band controller or the operating system can miss the error state if the other has already read and cleared the error state. In this example, only the first one of the out-of-band controller and the operating system is able to read and/or detect the accurate error state.

In some examples, a system on a chip (SoC) can include and/or implement an enhanced machine check architecture as well as various x86 processors and a system management unit that serves as an out-of-band interface. In one example, the system management unit implements firmware that understands communications from the internals (e.g., reporting entities, the machine check architecture, etc.) of the SoC and/or from an external out-of-band controller (e.g., a baseboard management controller). In this example, the internals of the SoC provide, facilitate, and/or support dedicated in-band error reporting to the x86 processors and out-of-band error reporting to the external out-of-band controller via an enhanced pipeline.

In some examples, the firmware of the system management unit can interface with the out-of-band controller to enable the out-of-band controller to access error reports stored in out-of-band registers of the enhanced machine check architecture. For example, the firmware of the system management unit obtains, receives, and/or retrieves error reports that arrive in the out-of-band registers of the enhanced machine check architecture. In this example, the firmware of the system management unit provides, sends, and/or delivers those error reports to the out-of-band controller for processing and/or utilization.

In some examples, the firmware of the system management unit can program and/or configure the out-of-band registers of the enhanced machine check architecture at the direction and/or instruction of the out-of-band controller. For example, the out-of-band controller directs and/or instructs the system management unit to program and/or configure the out-of-band registers to log and/or disregard certain errors reported by the enhanced machine check architecture. In this example, the firmware of the system management unit then performs and/or completes the programming and/or configuration of the out-of-band registers.

In some examples, the firmware of the system management unit communicates with the internals of the SoC without involving the operating systems running on the x86 processors. In one example, the out-of-band controller can direct and/or instruct the system management unit to access the error counts and/or states by reading the out-of-band registers that define and/or hold such error counts and/or states. In response to that direction and/or instruction, the system management unit can read the out-of-band registers and then communicate those error counts and/or states to the out-of-band controller. Additionally or alternatively, the firmware of the system management unit is trusted to proxy between the out-of-band state of the SoC and the out-of-band controller. Accordingly, the firmware of the system management unit can effectively standardize access to the out-of-band registers for the out-of-band controller. In certain implementations, the firmware of the system management unit can also abstract implementation-specific knowledge of the machine check architecture implementation from the out-of-band controller.

In some examples, a system includes and/or represents an out-of-band controller and/or a machine check architecture comprising a pipeline configured to deliver error reports from a plurality of circuits to at least one out-of-band register. In such examples, the system also includes and/or represents an out-of-band interface configured to provide the out-of-band controller with access to the error reports via the out-of-band register.

In some examples, the out-of-band interface implements firmware that standardizes access to the out-of-band register for the out-of-band controller. In one example, the firmware enables the out-of-band interface to coordinate transfer of the error reports from the out-of-band register to the out-of-band controller. Additionally or alternatively, the firmware enables the out-of-band interface to receive an instruction from the out-of-band controller to perform a specific action in response to a specific error identified in the error reports. For example, the specific action can include and/or represent triggering an interrupt that notifies the out-of-band controller of the specific error. In certain implementations, the firmware abstracts model-specific out-of-band register implementations from the out-of-band controller.

In some examples, the pipeline is further configured to deliver the error reports from the plurality of circuits to at least one in-band register. In such examples, the system also includes and/or represents at least one in-band processor configured to access the error reports via the in-band register.

In some examples, the in-band register is accessible to the in-band processor and inaccessible to the out-of-band interface and the out-of-band controller. In such examples, the out-of-band register is accessible to the out-of-band interface and inaccessible to the in-band processor.

In some examples, the out-of-band interface implements firmware configured to obtain the error reports from the out-of-band register and/or provide the error reports to the out-of-band controller. In such examples, the machine check architecture incorporates the out-of-band register and/or the in-band register.

In some examples, the pipeline includes and/or represents a unified lane configured to carry the error reports toward from the plurality of circuits toward the out-of-band register and the in-band register. In such examples, the pipeline also includes and/or represents a fork configured to split the unified lane into a first lane that carries a first copy of the error reports to the out-of-band register and a second lane that carries a second copy of the error reports to the in-band register.

In some examples, the system also includes and/or represents a first integrated circuit that incorporates the out-of-band controller and a second integrated circuit that incorporates the machine check architecture, the out-of-band interface, and the in-band processor. In one example, the out-of-band controller includes and/or represents a baseboard management controller that is external to the second integrated circuit. In this example, the out-of-band interface includes and/or represents a system management unit that is communicatively coupled to the baseboard management controller and is external to the first integrated circuit. In certain implementations, the out-of-band controller and the in-band processor are configured to make error-logging decisions independent of one another.

In some examples, a method includes and/or involves identifying, by an out-of-band interface implemented on a first integrated circuit, an error report stored in at least one out-of-band register of a machine check architecture. In such examples, the method also includes and/or involves obtaining, by the out-of-band interface, the error report from the out-of-band register. In one example, the method further includes and/or involves providing, by the out-of-band interface, the error report to an out-of-band controller implemented on a second integrated circuit for processing.

In some examples, the method also includes and/or involves implementing, in the machine check architecture, a pipeline configured to deliver the error reports from a plurality of circuits to the out-of-band register and at least one in-band register of the machine check architecture. In one example, the method further includes and/or involves implementing, in the out-of-band interface, firmware that standardizes access to the out-of-band register for the out-of-band controller. Additionally or alternatively, the method additionally includes and/or involves enabling the out-of-band interface to coordinate transfer of the error report from the out-of-band register to the out-of-band controller.

In some examples, the method also includes and/or involves enabling the out-of-band interface to receive an instruction from the out-of-band controller to perform a specific action in response to a specific error identified in the error report. For example, the specific action can include and/or represent triggering an interrupt that notifies the out-of-band controller of the specific error.

In some examples, an integrated circuit includes and/or represents at least one in-band processor and/or a machine check architecture. In such examples, the machine check architecture includes and/or represents a pipeline configured to deliver error reports from a plurality of circuits to at least one in-band register and at least one out-of-band register. In one example, the integrated circuit also includes and/or represents an out-of-band interface that is communicatively coupled to an external out-of-band controller and configured to provide the external out-of-band controller with access to the error reports via the out-of-band register.

The following will provide, with reference to FIGS. 1-4, detailed descriptions of exemplary devices, systems, and/or corresponding implementations for out-of-band logging and delivery of error reports. Detailed descriptions of an exemplary method for out-of-band logging and delivery of error reports will be provided in connection with FIG. 5.

FIG. 1 illustrates an exemplary computing device 100 that facilitates and/or supports out-of-band logging and delivery of error reports. As illustrated in FIG. 1, exemplary computing device 100 includes and/or represents a machine check architecture 102, an in-band processor 104, and/or an out-of-band controller 106. In one example, in-band processor 104 and/or out-of-band controller 106 are electrically and/or communicatively coupled to machine check architecture 102.

In some examples, machine check architecture 102 includes, represents, and/or implements a pipeline 112, a plurality of circuits 108(1)-(N), one or more in-band registers 116, and/or one or more out-of-band registers 118. In such examples, in-band processor 104 can be electrically and/or communicatively coupled to in-band registers 116, and out-of-band interface 120 can be electrically and/or communicatively coupled between out-of-band registers 118 and out-of-band controller 106. In one example, circuits 108(1)-(N) include and/or represent error detectors 110(1)-(N), respectively. In certain implementations, error detectors 110(1)-(N) detect errors that occur in circuits 108(1)-(N), respectively, and/or report the errors to in-band processor 104 and out-of-band controller 106 via pipeline 112.

In some examples, pipeline 112 carries, transports, and/or delivers error reports from circuits 108(1)-(N) to both in-band registers 116 and out-of-band registers 118. In such examples, in-band processor 104 can obtain, receive, and/or retrieve a copy of the error reports from in-band registers 116, and out-of-band interface 120 can obtain, receive, and/or retrieve another copy of the error reports from out-of-band registers 118. In one example, out-of-band interface 120 implements and/or executes firmware 114 that facilitates and/or supports interfacing with out-of-band registers 118 and/or out-of-band controller 106.

In some examples, firmware 114 can cause and/or enable out-of-band interface 120 to access error reports stored in out-of-band registers 118 of machine check architecture 102 for out-of-band controller 106. For example, firmware 114 causes and/or enables out-of-band interface 120 to obtain, receive, and/or retrieve error reports that arrive in out-of-band registers 118. In this example, firmware 114 then causes and/or enables out-of-band interface 120 to provide, send, and/or deliver those error reports to out-of-band controller 106 for processing and/or utilization. Accordingly, firmware 114 can standardize access to out-of-band registers 118 for out-of-band controller 106 by maintaining a certain communication protocol across different updates, configurations, and/or versions of machine check architecture 102.

In some examples, firmware 114 causes and/or enables out-of-band interface 120 to coordinate the transfer of the error reports from out-of-band registers 118 to out-of-band controller 106. In one example, firmware 114 causes and/or enables out-of-band interface 120 to obtain and/or receive an instruction from out-of-band controller 106 to perform a specific action in response to a specific error identified in the error reports. For example, the specific action can include and/or represent triggering an interrupt that notifies out-of-band controller 106 of the specific error. In certain implementations, firmware 114 abstracts model-specific out-of-band register implementations from out-of-band controller 106.

In some examples, machine check architecture 102 can include and/or represent a circuit, device, and/or mechanism that detects and/or reports errors to another circuit, device, and/or mechanism. For example, an SoC can include and/or implement machine check architecture 102 as well as various processors and/or central processing unit (CPU) cores. In this example, machine check architecture 102 is configured and/or programmed to monitor hardware errors that occur in circuits 108(1)-(N), the processors or CPU cores implemented on the SoC, and/or other features or components of the SoC.

In some examples, circuits 108(1)-(N) include and/or represent hardware blocks and/or banks of machine check architecture 102. In one example, the hardware blocks and/or banks include and/or represent memory controllers and/or CPU cores. Additionally or alternatively, the hardware blocks and/or banks include and/or represent control registers and/or model-specific registers used to check for, detect, and/or record various hardware and/or machine errors. Examples of such errors include, without limitation, memory or cache errors, buffer errors, translation errors, parity errors, system bus errors, error-correcting code (ECC) faults, error detection and correction (EDAC) faults, communication errors, input/output (I/O) errors, portions of one or more of the same, combinations or variations of one or more of the same, and/or any other detectable errors.

In some examples, in-band processor 104 can include and/or represent a hardware-implemented device and/or circuit capable of executing firmware, an operating system, and/or user applications. For example, in-band processor 104 can include and/or represent a graphics processing unit (GPU), a GPU core, a CPU, and/or a CPU core. In one example, in-band processor 104 can include and/or represent one of several processors (e.g., several x86 processors) implemented and/or disposed on an SoC. Additional examples of in-band processor 104 include, without limitation, parallel accelerated processors, tensor cores, microprocessors, microcontrollers, field-programmable gate arrays (FPGAs), application-specific integrated circuits (ASICs), integrated circuits, chiplets, portions of one or more of the same, variations or combinations of one or more of the same, and/or any other suitable in-band processor.

In-band processor 104 can implement and/or be configured with any of a variety of different architectures and/or microarchitectures. For example, in-band processor 104 can implement and/or be configured as a reduced instruction set computer (RISC) architecture. In another example, in-band processor 104 can implement and/or be configured as a complex instruction set computer (CISC) architecture. Additional examples of such architectures and/or microarchitectures include, without limitation, 16-bit computer architectures, 32-bit computer architectures, 64-bit computer architectures, x86 computer architectures, advanced RISC machine (ARM) architectures, microprocessor without interlocked pipelined stages (MIPS) architectures, scalable processor architectures (SPARCs), load-store architectures, portions of one or more of the same, combinations or variations of one or more of the same, and/or any other suitable architectures or microarchitectures.

In some examples, out-of-band controller 106 can include and/or represent a hardware-implemented device and/or circuit capable of interfacing with an integrated circuit (e.g., an SoC that implements various CPU cores) to facilitate controlling and/or modifying certain hardware features and/or components of the integrated circuit. In one example, out-of-band controller 106 can include and/or represent a baseboard management controller implemented outside (e.g., off-chip) and/or external to an SoC that implements in-band processor 104. Additional examples of out-of-band controller 106 include, without limitation, microprocessors, microcontrollers, FPGAs, ASICs, integrated circuits, chiplets, portions of one or more of the same, variations or combinations of one or more of the same, and/or any other suitable out-of-band controller.

In some examples, out-of-band interface 120 can include and/or represent a hardware-implemented device and/or circuit capable of facilitating access to certain hardware features and/or components on an integrated circuit (e.g., an SoC equipped with various CPU cores) for one or more external devices (e.g., out-of-band controller 106). In such examples, out-of-band interface 120 is implemented by or disposed on the integrated circuit. In one example, out-of-band interface 120 can include and/or represent a system management unit implemented onboard (e.g., on-chip) and/or internal to an SoC equipped with in-band processor 104. Additional examples of out-of-band interface 120 include, without limitation, microprocessors, microcontrollers, FPGAs, ASICs, integrated circuits, chiplets, portions of one or more of the same, variations or combinations of one or more of the same, and/or any other suitable out-of-band interface.

In some examples, the term "out-of-band" can refer to any component, circuit, and/or process that is dedicated to and/or supports the control plane (e.g., control data and/or firmware), the management plane, and/or data about the underlying device (e.g., an SoC). In contrast, the term "in-band" can refer to any component, circuit, and/or process that is dedicated to and/or supports the user plane (e.g., user data and/or user applications) running on and/or implemented by a processor (e.g., a CPU core of an SoC). In one example, an SoC's in-band workload can include and/or represent computing tasks performed for and/or in connection with the operating system and/or user applications running on a processor, and the SoC's out-of-band workload can include and/or represent computing tasks performed for any other purpose besides utilization and/or consumption by such user applications.

Figure 2:
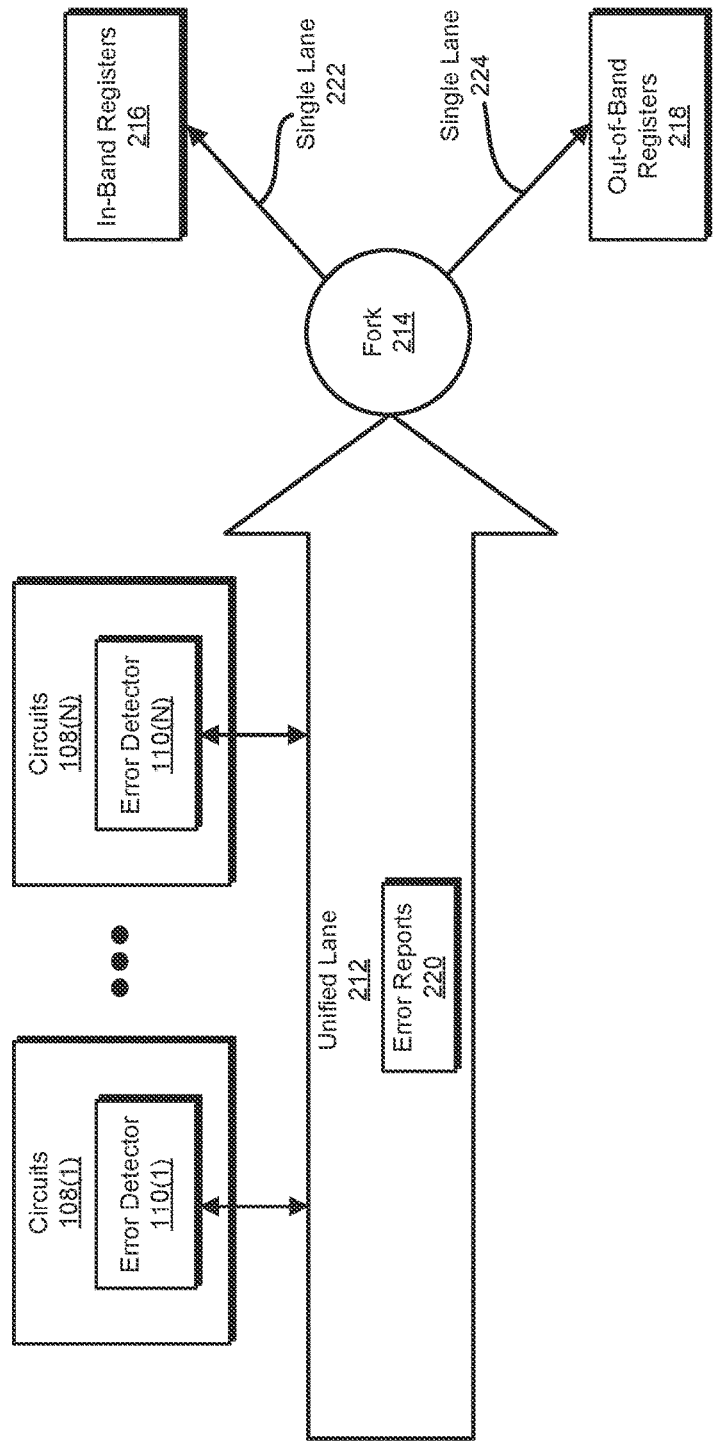
FIG. 2 is a block diagram of an exemplary machine check architecture that facilitates out-of-band delivery of error reports according to one or more implementations of this disclosure.

FIG. 2 illustrates an exemplary implementation of machine check architecture 102 that facilitates and/or supports out-of-band logging and delivery of error reports. In some examples, machine check architecture 102 can include and/or represent certain components and/or features that perform and/or provide functionalities that are similar and/or identical to those described above in connection with FIG. 1. In one example, pipeline 112 of machine check architecture 102 includes and/or represents a unified lane 212, a fork 214, a single lane 222, and/or a single lane 224. In this example, unified lane 212 carries and/or transports one or more error reports 220 toward both in-band processor 104 and out-of-band controller 106.

In some examples, unified lane 212 is electrically and/or communicatively coupled to fork 214. In such examples, unified lane 212 feeds and/or delivers error reports 220 to fork 214, which duplicates and/or copies error reports 220. For example, fork 214 splits and/or divides unified lane 212 into a single lane 222 and a single lane 224. In this example, single lane 222 carries and/or transports one copy of error reports 220 toward in-band processor 104, and single lane 224 carries and/or transports another copy of error reports 220 toward out-of-band controller 106.

In some examples, single lane 222 can electrically and/or communicatively couple fork 214 to in-band registers 116. Additionally or alternatively, single lane 224 can electrically and/or communicatively couple fork 214 to out-of-band registers 118.

In some examples, error detectors 110(1)-(N) monitor for and/or detect certain errors in and/or via circuits 108(1)-(N), respectively. In such examples, one or more of error detectors 110(1)-(N) generate and/or issue error reports 220 in response to the detection of such errors. In one example, error detectors 110(1)-(N) can send and/or transmit error reports 220 toward both in-band processor 104 and out-of-band controller 106 via pipeline 112. For example, error reports 220 can traverse and/or travel from one or more of circuits 108(1)-(N) to fork 214 via unified lane 212. In this example, fork 214 can duplicate and/or copy error reports 220 for transmission to both in-band registers 116 and out-of-band registers 118. Accordingly, one copy of error reports 220 can traverse and/or travel from fork 214 to in-band registers 116 via single lane 222, and another copy of error reports 220 can traverse and/or travel from fork 214 to out-of-band registers 118 via single lane 224.

In some examples, in-band registers 116 receive one copy of error reports 220 and store that copy of error reports 220 for access by in-band processor 104. Additionally or alternatively, out-of-band registers 118 receive another copy of error reports 220 and store that copy of error reports 220 for access by out-of-band controller 106. By delivering copies of error reports 220 to both in-band registers 116 and out-of-band registers 118 via pipeline 112, machine check architecture 102 can enable out-of-band controller 106 to access and/or obtain a copy of error reports 220 via out-of-band interface 120 without having in-band processor 104 forward the copy of error reports 220 to out-of-band controller 106, thereby mitigating and/or reducing the out-of-band work done by in-band processor 104, improving its performance or efficiency, and/or avoiding race conditions between in-band processor 104 and out-of-band controller 106. Moreover, by bypassing in-band processor 104 in delivering the copy of error reports 220 to out-of-band controller 106, machine check architecture 102 can prevent and/or avoid the need to push in-band processor 104 into system management mode, thereby mitigating and/or reducing the corresponding security vulnerabilities.

Figure 3:
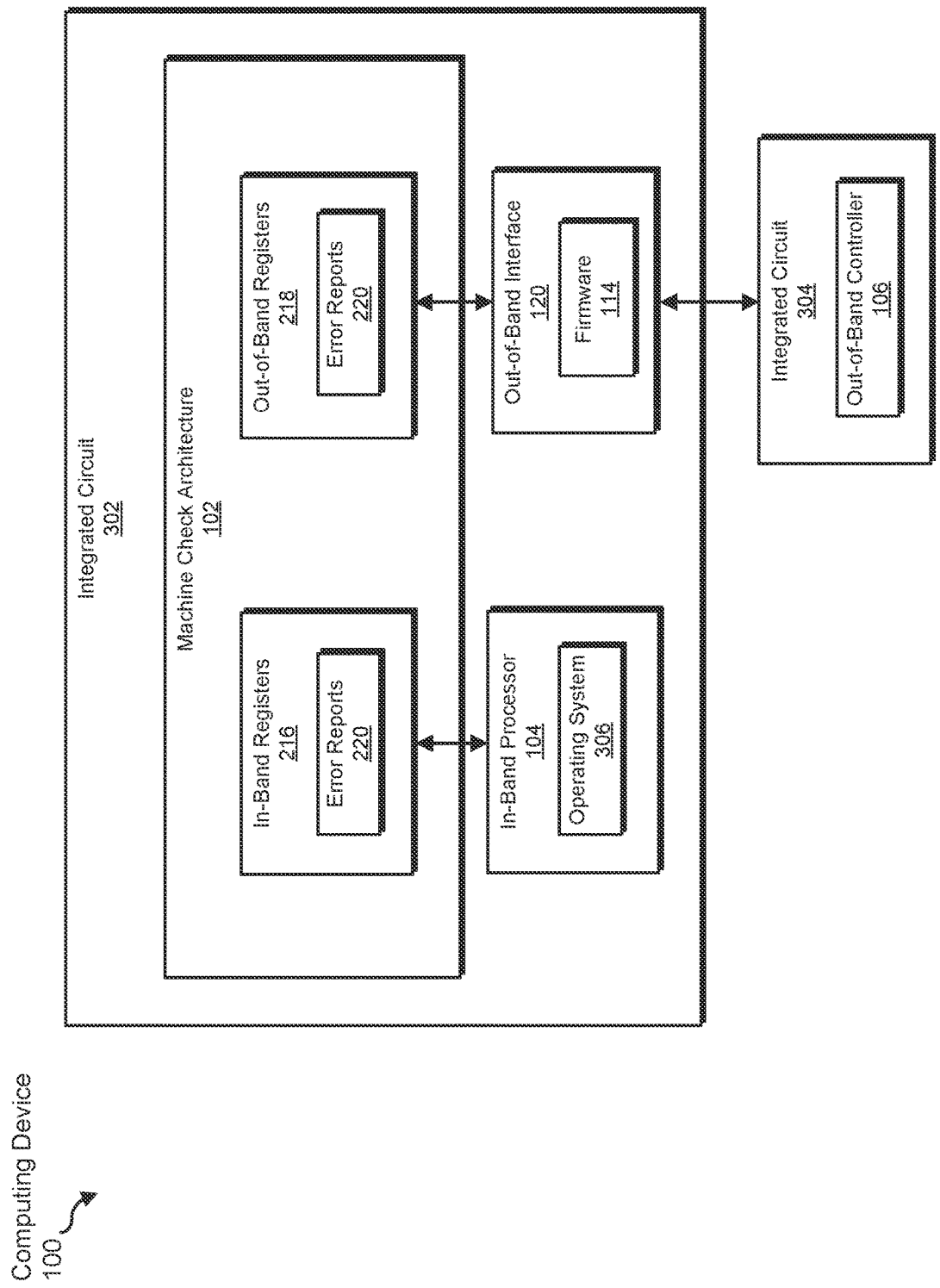
FIG. 3 is a block diagram of an exemplary computing device that facilitates out-of-band logging and delivery of error reports according to one or more implementations of this disclosure.

FIG. 3 illustrates an exemplary implementation of computing device 100 that facilitates and/or supports out-of-band logging and delivery of error reports. In some examples, computing device 100 can include and/or represent certain components and/or features that perform and/or provide functionalities that are similar and/or identical to those described above in connection with either of FIGS. 1 and 2. As illustrated in FIG. 3, exemplary computing device 100 includes and/or represents an integrated circuit 302 and an integrated circuit 304 communicatively coupled to one another. In one example, integrated circuit 302 includes and/or represents machine check architecture 102, in-band processor 104, and/or out-of-band interface 120. In this example, integrated circuit 304 includes and/or represents out-of-band controller 106 communicatively coupled to out-of-band interface 120, which implements firmware 114 that provides, facilitates, and/or supports access to the copy of error reports 220 stored in out-of-band registers 118 for out-of-band controller 106. Accordingly, integrated circuit 304 is off-chip from and/or external to integrated circuit 302. However, integrated circuits 302 and 304 can be installed on and/or applied to the same circuit board.

In some examples, integrated circuit 302 includes and/or represents an SoC with numerous CPU cores, machine check architecture 102, and out-of-band interface 120. In one example, in-band processor 104 is on-chip and/or internal to the SoC, and out-of-band interface 120 is on-chip and/or internal to the SoC. In this example, in-band processor 104 is able to access the copy of error reports 220 stored in in-band registers 116 but is restricted from accessing the copy of error reports 220 stored in out-of-band registers 118. For example, in-band processor 104 can implement and/or execute an operating system 306 that obtains, receives, and/or retrieves the copy of error reports 220 from in-band registers 116. Additionally or alternatively, out-of-band interface 120 is able to access the copy of error reports 220 stored in out-of-band registers 118 but is restricted from accessing the copy of error reports 220 stored in in-band registers 116.

In some examples, out-of-band interface 120 can include and/or represent a system management unit that implements and/or executes firmware 114 to obtain, receive, and/or retrieve the copy of error reports 220 from out-of-band registers 118. Additionally or alternatively, out-of-band controller 106 can include and/or represent a baseboard management controller that interfaces and/or communicates with the system management unit. In one example, the baseboard management controller obtains, receives, and/or retrieves the copy of error reports 220 from the system management unit.

In some examples, out-of-band controller 106 and/or out-of-band interface 120 can instruct and/or direct machine check architecture 102 to perform one or more specific actions in response to specific errors identified and/or included in error reports 220. For example, out-of-band controller 106 can direct and/or instruct out-of-band interface 120 to program and/or configure out-of-band registers 118 to initiate and/or trigger a specific action in response to a specific error. In one example, the specific action can include and/or represent triggering an interrupt that notifies out-of-band controller 106 of the specific error. For example, out-of-band interface 120 can be programmed and/or configured to generate the interrupt that notifies out-of-band controller 106 of the specific error.

In some examples, in-band processor 104 and out-of-band controller 106 can make error-logging decisions independent of one another. For example, in-band processor 104 can clear a certain flag (e.g., a status flag) in in-band registers 116 that remains set in out-of-band registers 118. Alternatively, out-of-band controller 106 can direct and/or instruct out-of-band interface 120 to clear a certain flag (e.g., a status flag) in out-of-band registers 118 that remains set in in-band registers 116. Either way, such flag mismatches across in-band registers 116 and out-of-band registers 118 can cause in-band registers 116 and out-of-band registers 118 to log and/or disregard different errors from the same error reports. Accordingly, in-band processor 104 and out-of-band controller 106 can have independent control and/or programmability over their respective registers in machine check architecture 102.

Figure 4:
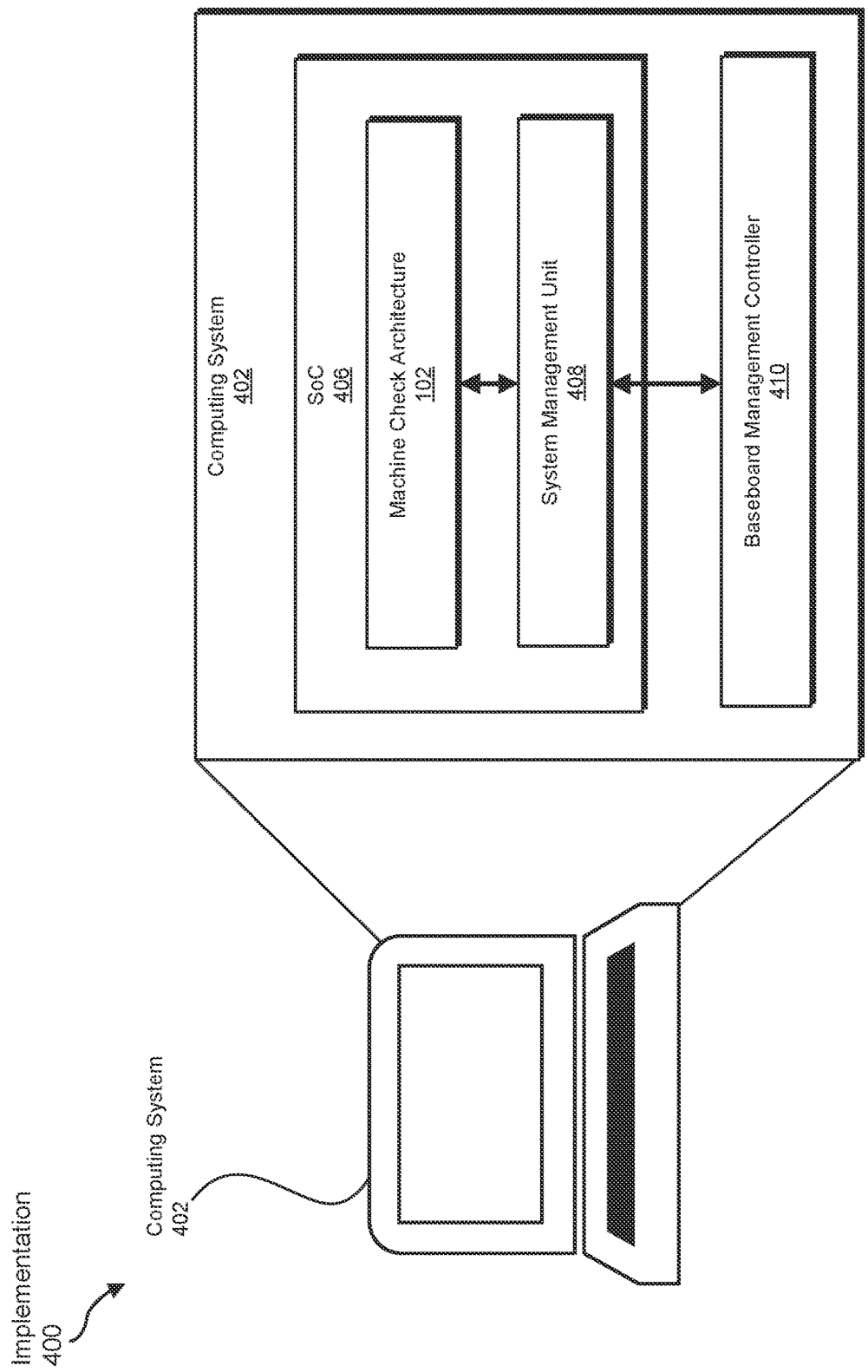
FIG. 4 is a block diagram of an exemplary implementation involving a computing system that facilitates out-of-band logging and delivery of error reports according to one or more variations of this disclosure.

FIG. 4 illustrates an exemplary implementation 400 involving a computing system 402. In some examples, computing system 402 can include and/or represent certain components and/or features that perform and/or provide functionalities that are similar and/or identical to those described above in connection with any of FIGS. 1-3. As illustrated in exemplary implementation 400 in FIG. 4, computing system 402 includes and/or represents an SoC 406 equipped with machine check architecture 102 and/or a system management unit 408.

In some examples, computing system 402 also includes and/or represents a baseboard management controller 410 that is electrically and/or communicatively coupled to system management unit 408. In one example, system management unit 408 obtains, receives, and/or retrieves a copy of an error report from an out-of-band register in machine check architecture 102. In this example, baseboard management controller 410 then obtains, receives, and/or retrieves the copy of the error report from system management unit 408 for processing and/or to facilitate decision-making.

In some examples, the various devices and/or systems described in connection with FIGS. 1-4 can include and/or represent one or more additional circuits, components, and/or features that are not necessarily illustrated and/or labeled in FIGS. 1-4. For example, computing device 100 can also include and/or represent additional analog and/or digital circuitry, onboard logic, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support out-of-band logging and delivery of error reports. In certain implementations, one or more of these additional circuits, components, devices, and/or features can be inserted and/or applied between any of the existing circuits, components, and/or devices illustrated in FIGS. 1-4 consistent with the aims and/or objectives provided herein. Accordingly, the electrical and/or communicative couplings described with reference to FIGS. 1-4 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct coupling between two components can constitute and/or represent a coupling in which those two components are directly connected to each other by a single node that provides electrical and/or communicative continuity from one of those two components to the other. In other words, the direct coupling can exclude and/or omit any additional components between those two components.

Additionally or alternatively, an indirect coupling between two components can constitute and/or represent a coupling in which those two components are indirectly connected to each other by multiple nodes that fail to provide electrical and/or communicative continuity from one of those two components to the other. In other words, the indirect coupling can include and/or incorporate at least one additional component between those two components.

Figure 5:
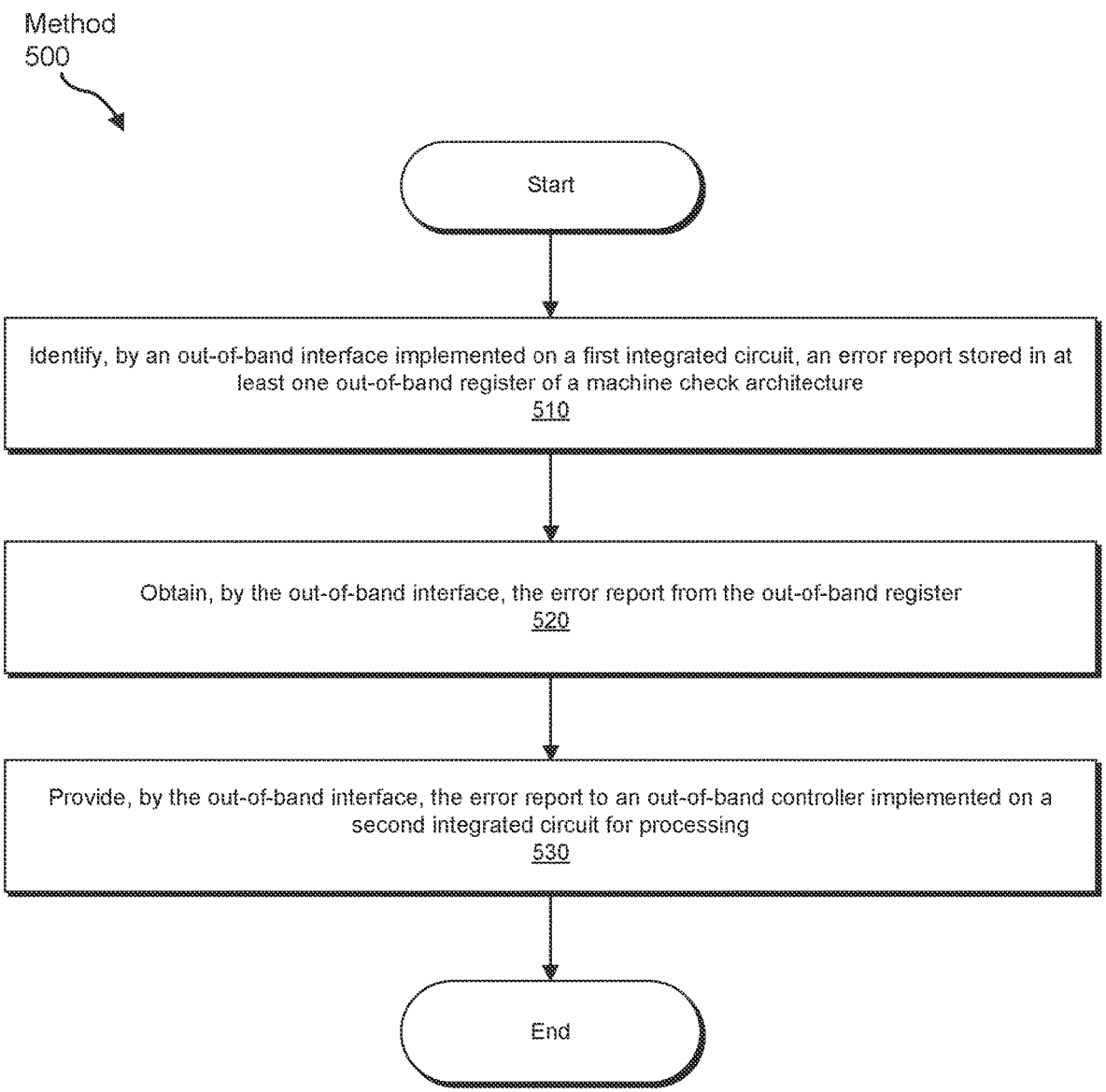
FIG. 5 is a flowchart of an exemplary method for out-of-band logging and delivery of error reports according to one or more implementations of this disclosure.

FIG. 5 is a flow diagram of an exemplary method 500 for out-of-band logging and delivery of error reports. In one example, the steps shown in FIG. 5 can be performed and/or executed during operation of a computing device and/or system capable of implementing out-of-band logging and delivery of error reports, as described herein. Additionally or alternatively, the steps shown in FIG. 5 can also incorporate and/or involve various sub-steps and/or variations consistent with the descriptions provided above in connection with FIGS. 1-4.

As illustrated in FIG. 5, exemplary method 500 include and/or involve the step of identifying, by an out-of-band interface implemented on a first integrated circuit, an error report stored in at least one out-of-band register of a machine check architecture (510). Step 510 can be performed in a variety of ways, including any of those described above in connection with FIGS. 1-4. For example, an out-of-band interface implemented by and/or disposed on a first integrated circuit can identify and/or locate an error report stored in at least one out-of-band register of a machine check architecture. In one example, the out-of-band interface can implement and/or execute firmware that facilitates and/or supports the identifying and/or locating of the error report in the out-of-band register.

Exemplary method 500 also includes the step of obtaining, by the out-of-band interface, the error report from the out-of-band register (520). Step 520 can be performed in a variety of ways, including any of those described above in connection with FIGS. 1-4. For example, the out-of-band interface can obtain, receive, and/or retrieve the error report from the out-of-band register. In one example, the firmware can cause and/or enable the out-of-band interface to obtain, receive, and/or retrieve the error report from the out-of-band register. In this example, the firmware can effectively standardize and/or conform access to the out-of-band register for an out-of-band controller via the out-of-band interface.

Exemplary method 500 further includes the step of providing, by the out-of-band interface, the error report to an out-of-band controller implemented on a second integrated circuit for processing (530). Step 530 can be performed in a variety of ways, including any of those described above in connection with FIGS. 1-4. For example, the out-of-band interface can provide, send, and/or deliver the error report to the out-of-band controller implemented on the second integrated circuit for processing and/or consumption. In one example, the firmware can cause and/or enable the out-of-band interface to coordinate transfer of the error report from the out-of-band register to the out-of-band controller.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects Illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    an out-of-band controller;
    a machine check architecture comprising a pipeline configured to deliver error reports from a plurality of circuits to at least one in-band register and at least one out-of-band register wherein:
        the out-of-band register is dedicated to a control plane of a computing device that incorporates the machine check architecture, a management plane of the computing device, or data about the computing device; and
        the in-band register is dedicated to a data plan of the computing device; and
    an out-of-band interface configured to provide the out-of-band controller with access to the error reports via the out-of-band register.

2. The system of claim 1, wherein the out-of-band interface implements firmware that standardizes access to the out-of-band register for the out-of-band controller.

3. The system of claim 2, wherein the firmware enables the out-of-band interface to coordinate transfer of the error reports from the out-of-band register to the out-of-band controller.

4. The system of claim 2, wherein the firmware enables the out-of-band interface to receive an instruction from the out-of-band controller to perform a specific action in response to a specific error identified in the error reports.

5. The system of claim 4, wherein the specific action comprises triggering an interrupt that notifies the out-of-band controller of the specific error.

6. The system of claim 2, wherein the firmware abstracts model-specific out-of-band register implementations from the out-of-band controller.

7. The system of claim 1, further comprising at least one in-band processor configured to access the error reports via the in-band register.

8. The system of claim 7, wherein:
    the in-band register is accessible to the in-band processor and inaccessible to the out-of-band interface and the out-of-band controller; and
    the out-of-band register is accessible to the out-of-band interface and inaccessible to the in-band processor.

9. The system of claim 8, wherein the out-of-band interface implements firmware configured to:
    obtain the error reports from the out-of-band register; and
    provide the error reports to the out-of-band controller.

10. The system of claim 8, wherein the machine check architecture incorporates:
    the out-of-band register; and
    the in-band register.

11. The system of claim 8, wherein the pipeline comprises:

a unified lane configured to carry the error reports from the plurality of circuits toward the out-of-band register and the in-band register; and a fork configured to split the unified lane into:
   a first lane that carries a first copy of the error reports to the out-of-band register; and
   a second lane that carries a second copy of the error reports to the in-band register.

12. The system of claim 7, further comprising:
a first integrated circuit that incorporates the out-of-band controller; and
a second integrated circuit that incorporates the machine check architecture, the out-of-band interface, and the in-band processor.

13. The system of claim 12, wherein:
the out-of-band controller comprises a baseboard management controller that is external to the second integrated circuit; and
the out-of-band interface comprises a system management unit that is communicatively coupled to the baseboard management controller and is external to the first integrated circuit.

14. The system of claim 7, wherein the out-of-band controller and the in-band processor are configured to make error-logging decisions independent of one another.

15. A method comprising:
identifying, by an out-of-band interface implemented on a first integrated circuit, an error report stored in at least one out-of-band register of a machine check architecture;
obtaining, by the out-of-band interface, the error report from the out-of-band register;
providing, by the out-of-band interface, the error report to an out-of-band controller implemented on a second integrated circuit for processing; and
implementing, in the machine check architecture, a pipeline configured to deliver the error report from a plurality of circuits to the out-of-band register and at least one in-band register of the machine check architecture, where the out-of-band register is dedicated to a control plane of a computing device that incorporates the machine check architecture, a management plane of the computing device, or data about the computing device; and the in-band register is dedicated to a data plan of the computing device.

16. The method of claim 15, further comprising implementing, in the out-of-band interface, firmware that standardizes access to the out-of-band register for the out-of-band controller.

17. The method of claim 16, wherein implementing the firmware in the out-of-band interface comprises enabling the out-of-band interface to coordinate transfer of the error report from the out-of-band register to the out-of-band controller.

18. The method of claim 16, wherein implementing the firmware in the out-of-band interface comprises enabling the out-of-band interface to receive an instruction from the out-of-band controller to perform a specific action in response to a specific error identified in the error report.

19. An integrated circuit comprising:
at least one in-band processor;
a machine check architecture comprising a pipeline configured to deliver error reports from a plurality of circuits to at least one in-band register and at least one out-of-band register wherein:
   the out-of-band register is dedicated to a control plane of a computing device that incorporates the machine check architecture, a management plane of the computing device, or data about the computing device; and
   the in-band register is dedicated to a data plan of the computing device; and
an out-of-band interface that is communicatively coupled to an external out-of-band controller and configured to provide the external out-of-band controller with access to the error reports via the out-of-band register.

* * * * *